July 2, 1929.  J. N. ALSOP  1,719,353
APPARATUS FOR COLLECTING AND UTILIZING CONSTITUENTS OF GASEOUS ELEMENTS
Filed Sept. 24, 1925  5 Sheets-Sheet 2
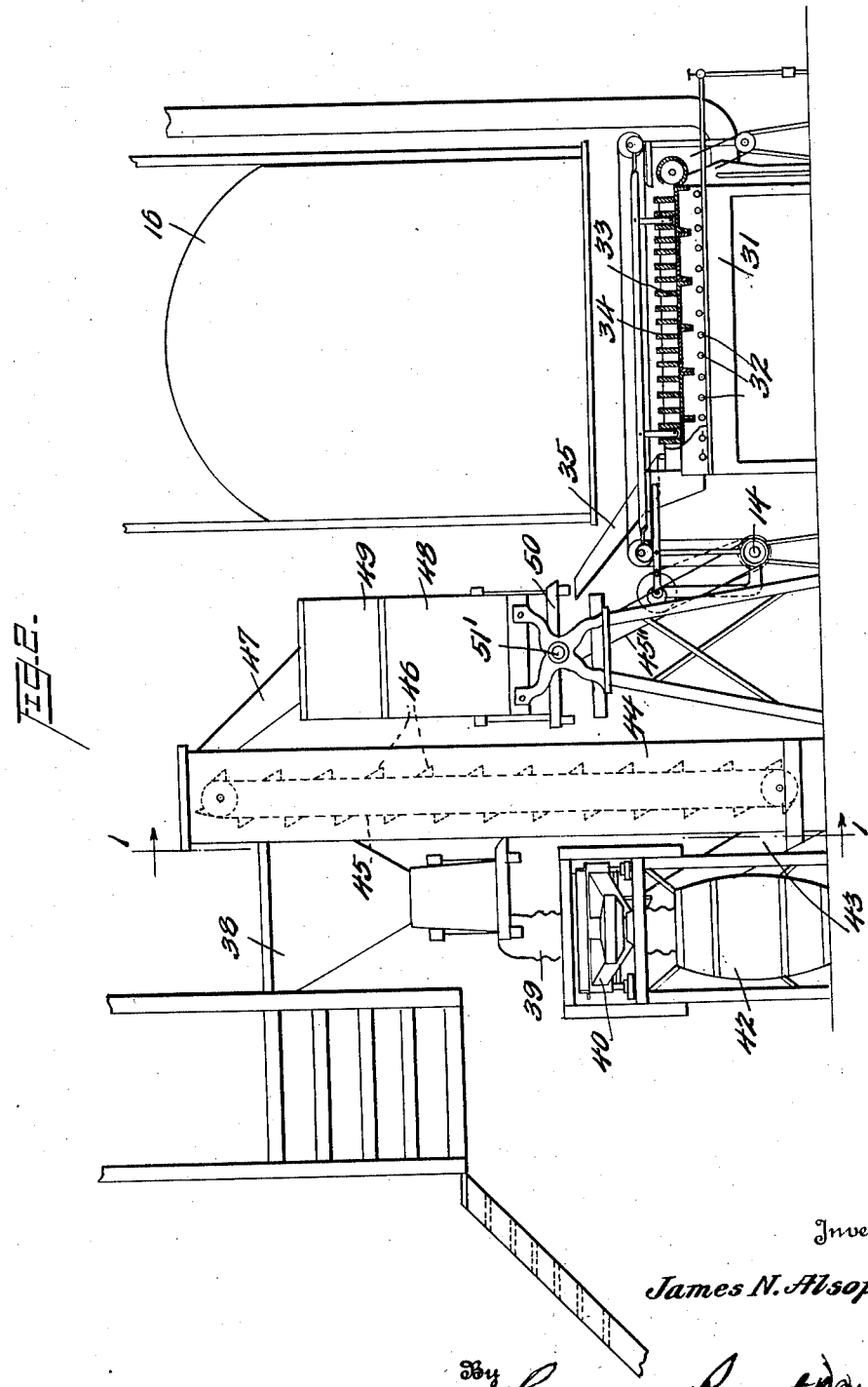
Inventor
James N. Alsop
By Cushman Bryant Darby
Attorney July 2, 1929.  J. N. ALSOP  1,719,353
APPARATUS FOR COLLECTING AND UTILIZING CONSTITUENTS OF GASEOUS ELEMENTS
Filed Sept. 24, 1925   5 Sheets-Sheet 3
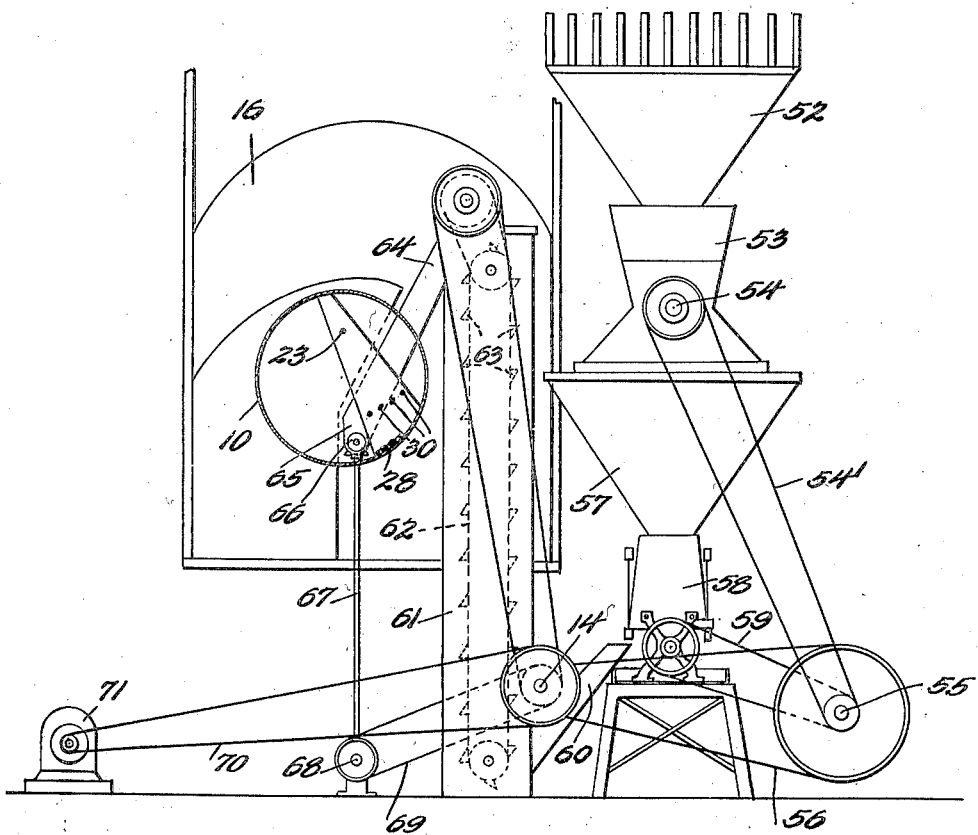
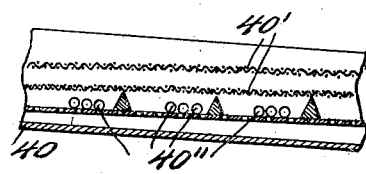
Inventor
James N. Alsop
By Cushman, Bryant Darby
Attorneys July 2, 1929. J. N. ALSOP 1,719,353
APPARATUS FOR COLLECTING AND UTILIZING CONSTITUENTS OF GASEOUS ELEMENTS
Filed Sept. 24, 1925 5 Sheets-Sheet 4
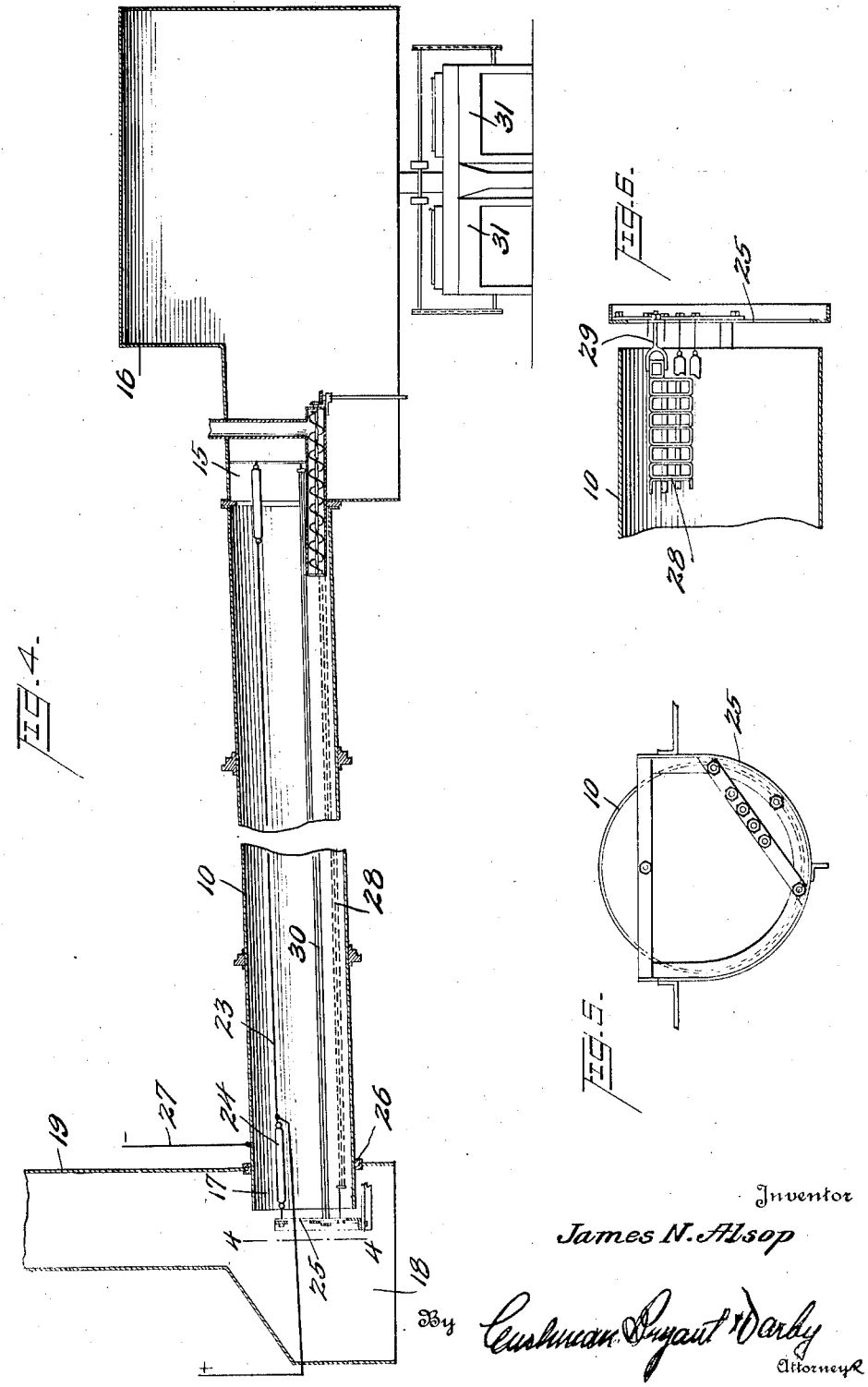
Inventor
James N. Alsop
By Cushman Bryant Darby
Attorneys July 2, 1929.   J. N. ALSOP   1,719,353
APPARATUS FOR COLLECTING AND UTILIZING CONSTITUENTS OF GASEOUS ELEMENTS
Filed Sept. 24, 1925   5 Sheets-Sheet 5
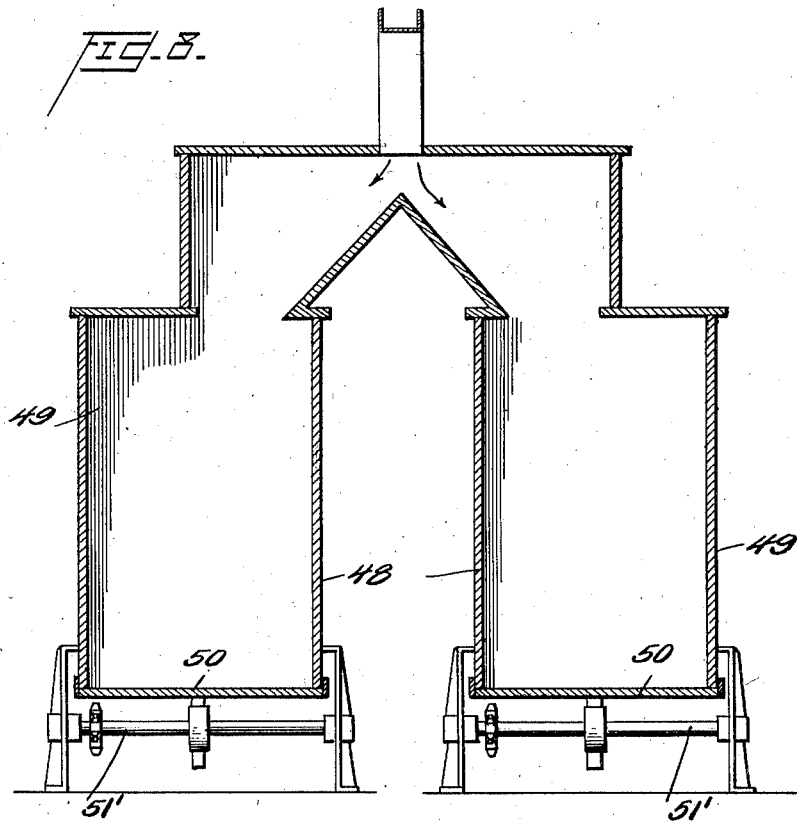
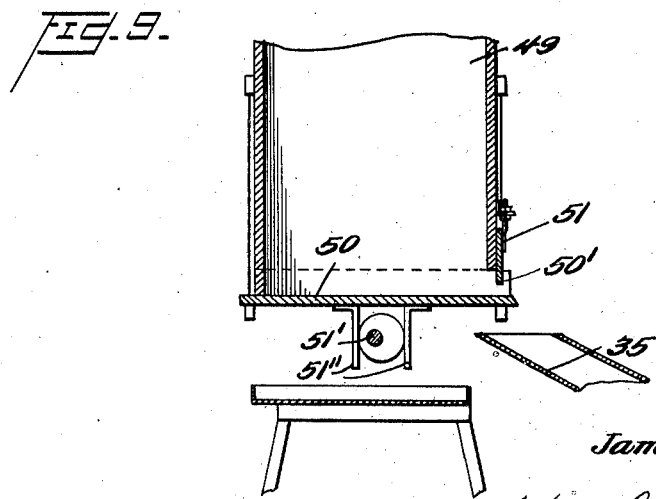
Inventor
James N. Alsop Patented July 2, 1929.

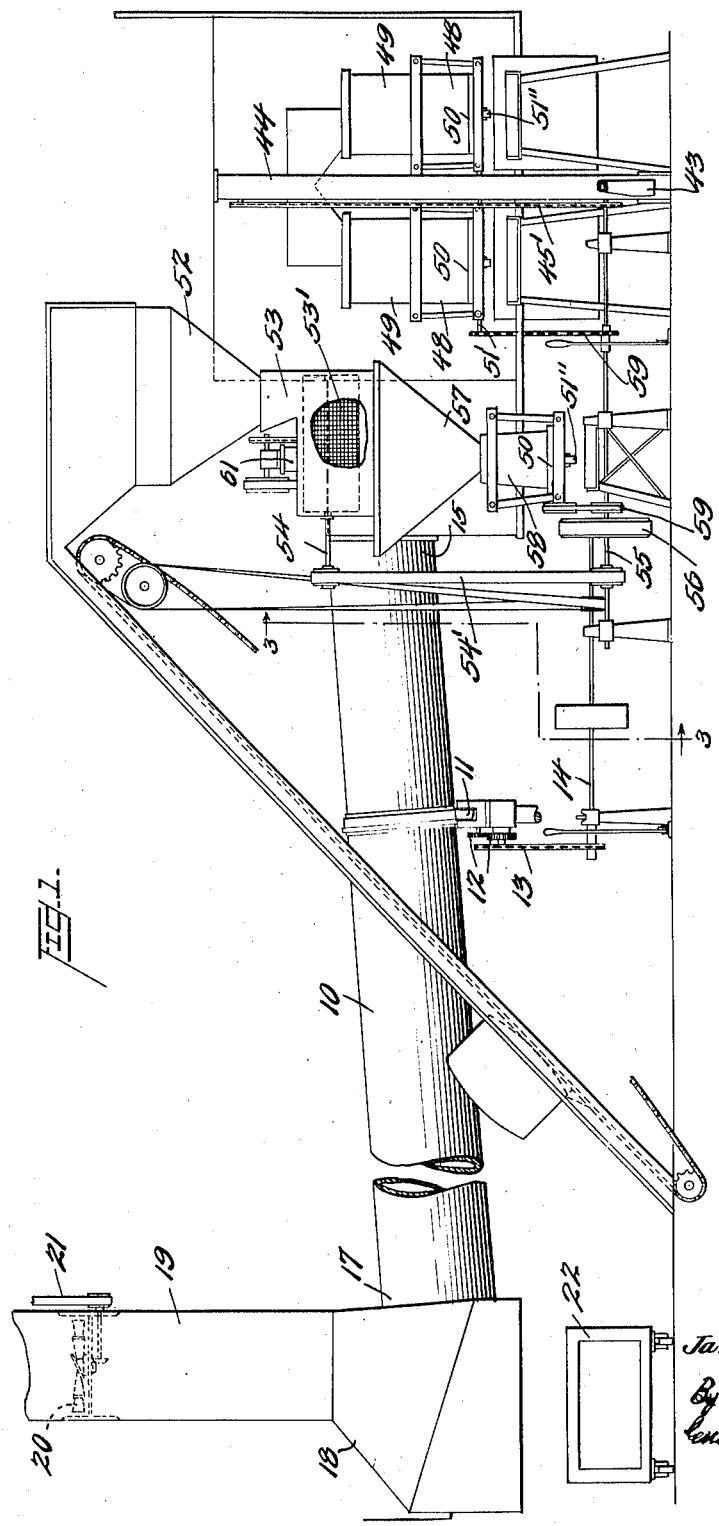

1,719,353

UNITED STATES PATENT OFFICE.

JAMES N. ALSOP, OF OWENSBORO, KENTUCKY, ASSIGNOR TO SMOKED PRODUCTS COMPANY, INCORPORATED, OF CINCINNATI, OHIO, A CORPORATION OF OHIO.

APPARATUS FOR COLLECTING AND UTILIZING CONSTITUENTS OF GASEOUS ELEMENTS.

Application filed September 24, 1925. Serial No. 58,328.

The present invention relates to an apparatus for obtaining from gaseous bodies, more particularly smoke, those solid, liquid and gaseous constituents having characteristics which render them useful in the treatment of various substances to impart to those substances taste, smell, appearance and other desirable qualities.

This application is, in part, a continuation of my co-pending application, Serial No. 574,192, filed July 11, 1922.

The apparatus disclosed may be used for the treatment of many substances, but for the purpose of this disclosure, salt will be given as one example of a product treated with the apparatus.

The invention has as its object the provision of an apparatus adapted to continuously carry out the method disclosed in my co-pending application, which consists, broadly, in obtaining, preferably by electrical means, certain constituents of a gaseous body, such as smoke, and mixing the constituents with the article to be treated, which, in the present instance, is salt. More particularly, the invention seeks to provide means for continuously carrying out the process, thereby making the operation of the process entirely or substantially automatic. The inventive object comprehends (1) the provision of means for automatically sifting and treating the material to be burned for the production of the smoke and the continuous supply or feeding of the same to a burner or smoke producer, (2) the provision of means for automatically sifting and supplying the material to be treated to a suitable chamber, where it is mixed with the smoke and with the electrically obtained precipitate, and (3) the automatic discharge of both the utilized smoke and the treated salt or other material.

It will be understood that the invention may be embodied in various mechanical forms, and for illustrative purposes, there is shown in the accompanying drawings one embodiment of the invention, some of the details being shown diagrammatically, since these constitute, specifically, no part of the invention herein claimed.

In the accompanying drawings:

Figure 1 is a section on the line 1—1 of Figure 2,

Figure 2 is an end elevational view,

Figure 3 is a vertical section on the line 3—3 of Figure 1,

Figure 4 is a longitudinal section taken through the precipitating and mixing drum, Figure 5 is a section on the line 5—5 of Figure 4, Figure 6 is a detail view, showing the connection of the wires and scraping chain to the supporting frame, Figure 7 is a fragmentary longitudinal section of the sawdust sifter, Figure 8 is a vertical sectional view on substantially the line 8—8 of Figure 2, showing the interior construction of the devices for feeding the sawdust to the burners, and Figure 9 is a vertical section of one of the feeding devices on substantially the line 9—9 of Figure 8.

Referring to the drawings for a more detailed description, 10 indicates a precipitating and treating chamber, which, in the present instance, is in the form of a revolving drum, having any suitable support and rotating means, such as the roller bearings 11 driven through gears 12 and chain 13 from a power shaft 14. The inlet end 15 of the drum communicates with a smoke collecting hood 16, and the opposite end 17 communicates with a discharge hood 18 and a stack 19, which may be provided with exhaust means, such as a fan 20, driven by means of a belt 21, to draw the smoke through the drum 10. The bottom of the hood 18 is open, and may permit the treated salt to discharge into a suitable receptacle, such as a carrier 22.

Within the drum is provided means for creating an electrical field for precipitation of the smoke travelling therethrough. For this purpose, an uni-directional current should preferably be employed, and may be introduced by means of a wire 23 connected through suitable insulators 24 to the stationary supports 25. It will be observed that the wire is spaced from the wall of the drum so as to create an electrical field between the same and the drum, and the latter may be insulated at its ends by means of rings 26 from the hoods, and, through the wire 27, form a part of the electrical circuit. Smoke travelling through the drum and in the electrical field will have certain of its constituents precipitated and deposited upon the wall of the drum. This precipitate may be removed from the wall in any suitable manner, either by the abrasive action of the material passing through the drum or by positive scraping means, such as a chain 28 (Fig. 6), connected at its ends 29 to the supports 25. The chain is supported so that its links may engage the walls of the drum as it revolves and loosen the smoke precipitate which tends to adhere to the drum. This precipitate will then mix with and impart characteristics to any material, such as salt, which is conducted through the drum.

It is preferable that the electrical field be excluded from the material to be treated, particularly when this material is salt, since the application of the electrical discharge to the salt has an undesirable effect upon the salt. For this purpose, a plurality of wires 30 extend from one end of the drum to the other beneath the wire 23, but above the bottom of the drum. These wires are connected at their opposite ends to the supports 25, and thereby suitably grounded, so that any discharge of current from the wire 23 toward the bottom of the drum may be intercepted by the wires 30 and grounded before it reaches the material.

It will be understood that as the drum revolves the salt is tumbled about and thereby repeatedly showered through the smoke which has not been subjected to the electrical field as well as through the smoke precipitated by the electrical field. The smoke which enters and fills the drum is in its natural or vaporous state, i. e. unmixed with any unadulterated liquid or the like. Hence, the salt is subjected to an unmodified or vaporous smoke in addition to being subjected to the resultant of the electrical action upon the smoke. The salt treated in this manner has its crystals or particles thoroughly coated with the smoke and with the precipitate obtained by the electrical field.

In addition to the provision of the particular apparatus for precipitating the smoke and mixing the precipitate with the salt, there is provided means for continuously supplying the smoke to the drum, and for feeding material to be burned to the smoke producer. The burner or smoke producer which is illustrated, is disclosed and described in detail in my co-pending application, Serial No. 6,585, filed February 3, 1925, and, specifically forms no part of the present invention. It consists, broadly, of a pair of units 31 (Figure 4), each unit comprising a series of burner pipes 32 arranged below a bed 33 having a reciprocating feeding plate 34, which receives the material through a chute 35 at the receiving end of each unit, and feeds it toward the opposite or discharge end over the burner bed 33. It will be observed that the hood 16 is spaced above the burners so that air may mix suitably with the smoke from the burned material, which, preferably, is saw dust, and the smoke and commingled air will then travel onwardly through the drum. It is thought unnecessary to describe the burner more in detail, since the same is shown and described in my co-pending application, above referred to.

As stated, however, the present invention comprehends the provision of means for automatically and continuously feeding saw dust to the smoke producing units, and also means for sifting the saw dust or other material to be burned, so that the desirable portions of the same may be fed to the burners. As illustrated more clearly in Figures 1 and 2, the feeding mechanism comprises an initial receiving bin 38, from which the saw dust is directed through a conduit 39 to a sifting mechanism 40. The sifting mechanism may be of any suitable type. In actual practice, a sifter of the type shown in the patent to Simpson, 1,265,267, May 7, 1918 has been found to be satisfactory, and a device of this character is shown in end view, (Figure 2). Since the sifting machine specifically constitutes no part of the present invention, and since such devices are well known in the art, it is throught that no detailed description is here necessary. The sifter comprises moving screens 40' having beneath them cleaning balls 40" (Fig. 7); this mechanism directs the tailings or undesirable portions of the sawdust to a barrel or other receptacle 42 (Fig. 2), and the portion to be used is discharged into a chute 43, which leads it to the base of a vertical housing 44, having therein a travelling conveyor 45 carrying lifting buckets 46, which lift the sawdust upwardly and discharge the same through a chute 47 to feeders 48 (Fig. 8). Each feeder comprises a hopper portion 49 and a reciprocable feed plate 50, which closes the lower end of the hopper, and, as reciprocated, directs the saw dust through an opening 50' between the plate and the adjustable gate 51 to the chute 35 leading to a burner unit. It will be noted that the conveyor 45 is driven by means of a chain 45' from the power shaft 14 (Fig. 1), and a driving belt or chain 45" (Fig. 2) connects the power shaft with a shaft 51' beneath the feed plates 50. The shaft 51 carries feed plate actuating arms 51". By means of the mechanism, the sawdust is automatically sifted and fed continuously to the burner after it is introduced in suitable quantities into the initial receiving bin 38.

Mechanism is also provided for automatically sifting and feeding the salt or other material to be treated to the drum. This mechanism includes a salt receiving bin 52, which opens into a sifter 53. The sifter may be of any suitable type, and since it constitutes specifically no part of the present invention; it will not be described here in detail. There is illustrated, somewhat diagrammatically, a well known type of sifter, comprising a casing which encloses a substantially circular screen 53', the screen serving to enclose a beater element, which is carried by a shaft 54 extending through the housing, the shaft being driven by means of a belt 54' (Figure 3) from countershaft 55; the countershaft receives its power by a drive belt 56 through power shaft 14.

After treatment by the sifter 53, the salt is directed to a hopper 57, which, at its lower end, opens into a feeder 58, driven from countershaft 56 by means of belt 59. The feeder, which is of the same construction as the saw dust feeders 48, directs the salt through a chute 60 into the lower end of a vertical housing or boot 61 enclosing a vertically travelling conveyor 62, which, by means of buckets 63, carries the salt upwardly to a chute 64. The chute directs the salt downwardly into a trough 65, which extends forwardly into the drum and carries a screw conveyor 66 for feeding material through the open end of the trough 65 into the drum. This conveyor may be driven by means of a vertical shaft 67, which, in turn, receives power from a horizontal countershaft 68 driven by a belt 69 from the power shaft 14 (Figure 3). By means of this mechanism, the salt introduced into the receiving bin 52 will be continuously sifted and fed to the drum to be mixed with the smoke precipitate. The inclination of the drum causes the salt to progress or travel through the same toward the receiving bin 19. During this travel, as will be understood, it is mixed with the smoke precipitate, which is removed from the drum, both by the abrasive action upon the surface of the drum and the scraping chain 28. Moreover, the revolution of the drum lifts and drops the salt as it progresses therethrough, thus showering the same through the smoke and obtaining a thorough coating of salt particles by the precipitant and by the unprecipitated smoke.

As will be noted from an inspection of Figure 3, the power shaft 14 may be driven by means of a belt 70 from a motor 71, and through suitable driving connections, imparts movement to the other driven elements of the apparatus.

What I claim is:

1. In an apparatus of the class described, the combination of a receiving chamber, means for delivering smoke to said chamber, means for precipitating electrically from said smoke constituents thereof and collecting the same in said chamber, means for introducing material to be treated into said chamber, and means for mixing with the precipitate collected in said chamber the material introduced thereinto.

2. In an apparatus of the class described, the combination of a receiving chamber, means for delivering smoke to said chamber, means for precipitating electrically from said smoke in said chamber constituents thereof and collecting such precipitated constituents within said chamber, and means for moving the chamber to pass material introduced thereinto through said chamber and mix it with said precipitated constituents.

3. In an apparatus of the class described, the combination of a receiving chamber, means for delivering a gaseous body to said chamber, means for precipitating electrically from said body constituents thereof upon the wall of said chamber, means for removing the precipitate from the chamber wall and means for passing material through said chamber and mixing it with said precipitated constituents.

4. In an apparatus of the class described, the combination of a receiving chamber, means for delivering smoke to said chamber, means for electrically precipitating constituents of the smoke within said chamber, means for delivering material to be treated to said chamber, and means for moving the chamber for passing the material through said chamber and mixing it with the precipitate.

5. In an apparatus of the class described, the combination of a receiving chamber, means for delivering smoke to said chamber, means for electrically precipitating constituents of the smoke on the wall of said chamber, means for delivering material to be treated to said chamber, and means for passing the material through said chamber and mixing it with the precipitate.

6. In an apparatus of the class described, the combination of a receiving chamber, means for delivering smoke to said chamber, means for electrically precipitating constituents of the smoke causing deposition of the precipitant on a suitable body within said chamber, means for delivering material to be treated to said chamber, and means for removing said precipitate from said body and mixing the same with the material in the chamber.

7. In an apparatus of the class described, the combination of a receiving chamber, means for delivering smoke to said chamber, means for precipitating electrically constituents of the smoke on the wall of the chamber, means for delivering material to be treated to said chamber, means for removing the precipitate from the wall of the chamber, and means for causing passage of the material through said chamber in contact with said precipitate.

8. In an apparatus of the class described, the combination, of a chamber, means for revolving said chamber, means for delivering smoke to said chamber, means for electrically precipitating constituents of the smoke within the chamber, means for feeding material to said chamber, and means for moving the chamber to cause travel of material therethrough.

9. In an apparatus of the class described, the combination of a chamber, means for revolving said chamber, means for delivering smoke to the chamber, means for electrically precipitating constituents of the smoke upon the wall of said chamber, and means for feeding material to be treated to said chamber, the chamber being revoluble to cause material to travel therethrough, and means for removing the precipitate from the wall of the chamber and permitting the same to be mixed with the material as it passes therethrough.

10. In an apparatus of the class described, the combination of a revoluble chamber arranged so that material introduced thereinto will travel therethrough, means for introducing smoke into said chamber, means for electrically precipitating constituents of the smoke in said chamber, means for feeding material to be treated into the chamber and means for revolving said chamber and thereby mix the material with the precipitate as it passes through the chamber.

11. In an apparatus of the class described, the combination of a revoluble chamber arranged so that material introduced thereinto will travel therethrough, means for introducing smoke into said chamber, means for creating an electrical field for precipitating constituents of the smoke in said chamber, means for feeding material to be treated into the chamber, means for revolving the chamber and thereby mix the material with the precipitate as it passes through the chamber, and means for excluding the electrical field for precipitation from the material.

12. In an apparatus of the class described, the combination of a receiving chamber, means for delivering smoke to said chamber, means for creating an electrical field for precipitating constituents of the smoke and causing deposition of the precipitate on a suitable body within said chamber, means for delivering material to be treated to said chamber, means for causing removal of said precipitate from said body and mixing of the same with the material in the chamber, and means for excluding the electrical field for precipitation from the material.

13. In an apparatus of the class described, the combination of a receiving chamber, means for delivering smoke to said chamber, means for creating an electrical field for precipitating constituents of the smoke on the wall of the chamber, means for delivering material to be treated to said chamber, means for removing the precipitate from the wall of the chamber, means for causing passage of the material through said chamber in contact with said precipitate, and means for excluding the electrical field for precipitation from the material.

14. In an apparatus of the class described, the combination of a chamber, means for revolving said chamber, means for delivering smoke to said chamber, means for creating an electrical field for precipitating contituents of the smoke within the chamber, means for feeding material to said chamber and for mixing the same with the precipitate of the smoke in the chamber, and means for excluding the electrical field for precipitation from the material.

15. In an apparatus of the class described, the combination of a chamber, means for revolving said chamber, means for delivering smoke to the chamber, means for creating an electrical field for precipitating constituents of the smoke upon the wall of said chamber, means for feeding material to be treated to said chamber, the chamber being arranged to cause material to travel therethrough, means for removing the precipitate from the wall of the chamber and permitting the same to be mixed with the material as it passes therethrough, and means for excluding the electrical field for precipitation from the material.

16. In an apparatus of the class described, the combination of a receiving chamber, means for producing and delivering smoke to said member, means for precipitating electrically from said smoke constituents thereof and collecting such precipitated constituents within said chamber, and means for passing material through said chamber and mixing it with said precipitated constituents.

17. In an apparatus of the class described, the combination of a receiving chamber, means for producing and delivering smoke to said chamber, means for precipitating electrically from said smoke constituents thereof and collecting such precipitated constituents upon the wall of said chamber, and means for passing material through said chamber in contact with the chamber wall whereby to assist in removing the precipitate therefrom and mixing it with said precipitated constituents.

18. In an apparatus of the class described, the combination of a movable receiving chamber, means for producing and delivering smoke to said chamber, means for precipitating electrically constituents of the smoke within said chamber, means for delivering material to be treated to said chamber, and means for moving the chamber to pass the material through said chamber and mix it with the precipitate.

19. In an apparatus of the class described, the combination of a chamber, means for revolving said chamber, means for continuously producing and delivering smoke to the chamber, means for electrically precipitating constituents of the smoke upon the wall of said chamber, and means for feeding material to be treated to said chamber, the chamber being arranged to cause material to travel therethrough, and means for removing the precipitate from the wall of the chamber and causing the same to be mixed with the material as it passes therethrough.

20. An apparatus for producing smoked salt comprising a chamber adapted to retain salt, means for introducing salt into said chamber, means for continuously producing and introducing smoke into said chamber, and means for agitating the salt in said smoke during the introduction of the smoke into said chamber, thereby coating the salt particles with said smoke.

21. Apparatus for producing smoked salt comprising a drum having a substantially imperforate circumferential wall, means for continuously feeding salt into said drum, means for producing and continuously introducing smoke into said drum, and means for revolving the drum and thereby repeatedly showering the salt through the smoke and coating the salt particles.

22. Apparatus for producing smoked salt comprising a drum having a substantially imperforate circumferential wall, means for continuously feeding salt into said drum, means for producing and continuously introducing smoke into said drum, and means for revolving the drum and thereby repeatedly showering the salt through the smoke and coating the salt particles, said drum having its wall inclined so that the salt progresses therethrough as it is agitated in the smoke.

In testimony whereof I have hereunto set my hand.

JAMES N. ALSOP.